ized Stcs Patent [19] [11] 3,879,107
Chaban [45] Apr. 22, 1975

[54] MICROSTEREOSCOPE
[75] Inventor: Richard J. Chaban, Northridge, Calif.
[73] Assignee: McBain Instruments, Inc., Chatsworth, Calif.
[22] Filed: Sept. 4, 1973
[21] Appl. No.: 394,243

[52] U.S. Cl. ................................ 350/138; 350/36
[51] Int. Cl. ..................... G02b 27/24; G02b 21/22
[58] Field of Search ..................... 350/138, 137, 36

[56] References Cited
UNITED STATES PATENTS
3,418,034   12/1968   Ambrose ........................... 350/138

Primary Examiner—Paul A. Sacher
Attorney, Agent, or Firm—Perry E. Turner

[57] ABSTRACT

Respective zoom lenses are located in a pair of rhomboid arms at the bottom of a housing above an object plane, and reflecting elements cause the magnified images from the zoom lenses to be directed along vertical paths to an image plane above the arms. Relay lenses above the image plane transfer the images to mirrors for reflection inboard of the vertical paths and thence through image rotators. The images are viewed through parallel eyepieces to which the images are transferred from the image rotators by relay lenses and reflecting elements. Also shown is a beam splitter for selective insertion in the path from one image rotator for directing part of the light upwardly to be relayed and directed to a vidicon camera for use in monitor screen viewing, and a beam splitter and mirror combination to be selectively positioned so that part of the light from one image rotator is directed through the other eyepiece for mono viewing. Each rhomboid arm and the associated relay above it are supported for limited vertical movement in unison, and the arms are also rotatable. Respective control knobs are operable to effect such limited vertical movement and rotation. Further control knobs are provided for moving the camera-associated beam splitter into and out of position, and for moving the mono-associated beam splitter and mirror into and out of position. Additionally, zoom controls are shown as motors controlled from a servo control system having inputs from respective knob-operable potentiometers for operating the zoom lenses independently, and an input from a further knob-operable potentiometer for operating the zoom lenses simultaneously.

5 Claims, 6 Drawing Figures

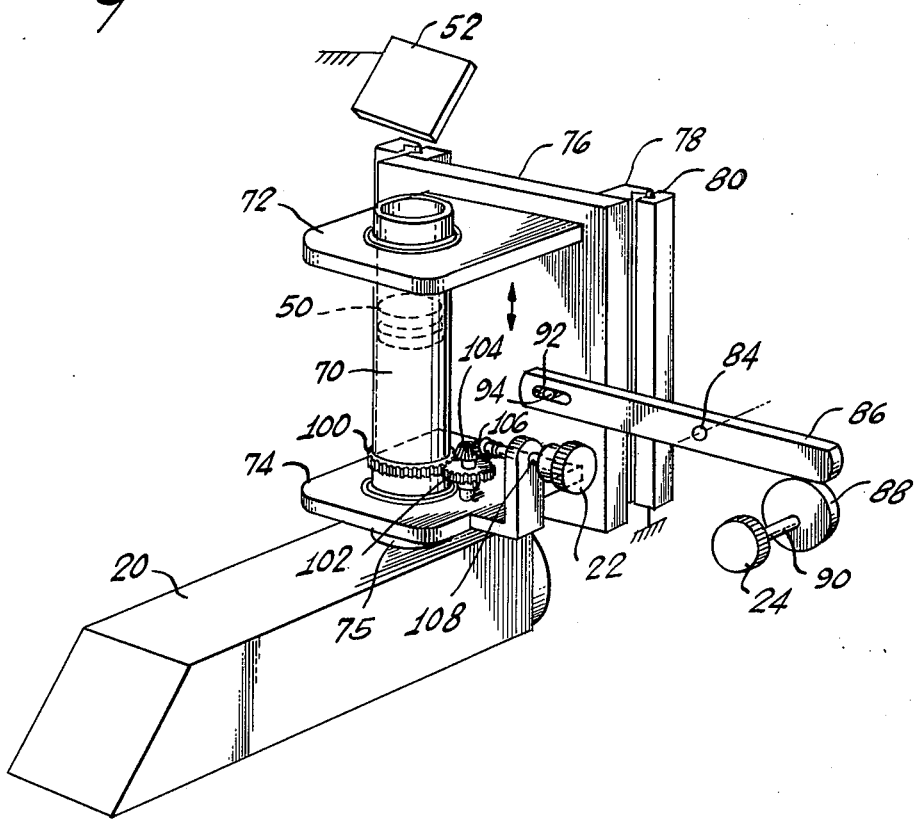

MICROSTEREOSCOPE

BACKGROUND OF THE INVENTION

1. Field of the Invention

This invention relates to stereoscope device such as are used for analyzing aerial photographs.

2. Description of the Prior Art

As heretofore known in a photointerpretation stereoscope, image separations are transferred through rhomboid arms that are rotatable on the bottom of the housing of a stereoscopic zoom microscope. Through each arm, the image is transferred via a mirror and relay lens system in the arm to the focal point near the inner end of the arm, and thence via another reflector to an eyepiece along a divergent optical path that includes an objective lens, a zoom lens and a Pechan prism image rotator. The zoom lenses are used for magnifying the images relayed thereto so they appear identical in size, and the image rotators are used to align images which in the object plane are angularly displaced relative to each other.

The relay lens optics determine how good is the image at the focal point in each arm, and thus what can be expected to be seen through the microscope. This necessitates the use of relay lenses of high resolution and of the quality of the microscope optics in order to minimize degradation of the images relayed through the arms. Image degradation is also a function of the number of lens elements employed in the relay lens systems. Such relay lenses are extremely difficult and expensive to manufacture. Furthermore, as the number of such lens elements is increased in an effort to present a nondegraded image at the focal point, light transmission suffers appreciably. It is not uncommon to find more than a seventy percent decrease in light transmission in such photointerpretation stereoscopes, primarily due to the relay lens optics.

Further undesired expense in such photointerpretation stereoscopes is presented by the type of prisms which must be used for the image rotators in the microscope. Since the optical paths through the microscope diverge to the eyepieces, image rotating prisms with multiple internal reflections are used which must be very carefully made in order to avoid introducing astigmatic effects into the optical system. Such prisms as the Pechan type prisms are undesirably difficult and expensive to make, and cannot be replaced with relatively simple and inexpensive prisms, such as dove image rotators, which would introduce astigmatic effects into the optical system of converging/diverging microscope optics.

Still another disadvantage of such stereoscopes relates to the working distance or clearance between the object or film plane and the rhomboid arms. In this connection, it is common practice to add auxiliary stereo lenses at the ends of the arms for magnifying the images to be relayed through them. In a specific example with known devices, a working distance of only 0.5-in. is all that is available with 2.0X stereo lenses. The analyst is thus presented with a markedly difficult task when the attempts to mark the films he is inspecting. His problems are further compounded by the fact that there is relatively short lateral spacing between the eyepieces and the ends of the rhomboid arms in their outermost positions, which circumstance forces him to work from a fatiguing posture in which he leans over and above the work while viewing portions of films farthest from him.

BRIEF DESCRIPTION OF DRAWINGS

FIG. 5 is a perspective view of elements used for vertical positioning of the rhomboid arm and vertically disposed relay lens, and for independently rotationally positioning the arm;

DESCRIPTION OF ILLUSTRATIVE EMBODIMENTS

Figure 1:
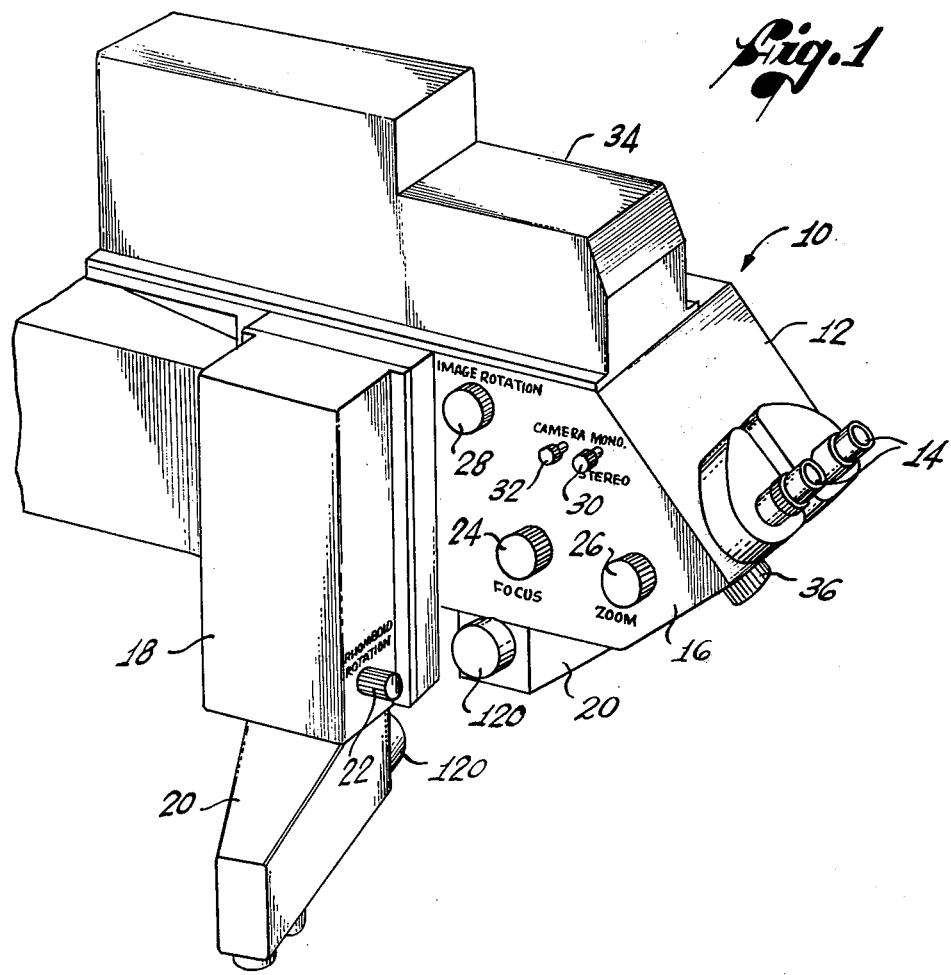
FIG. 1 is a perspective view of a microstereoscope of the invention, showing external control knobs for positioning the rhomboid arms vertically and horizontally, for controlling zoom control motors, and for selectively positioning image rotator and beam splitter elements.
Figure 2:
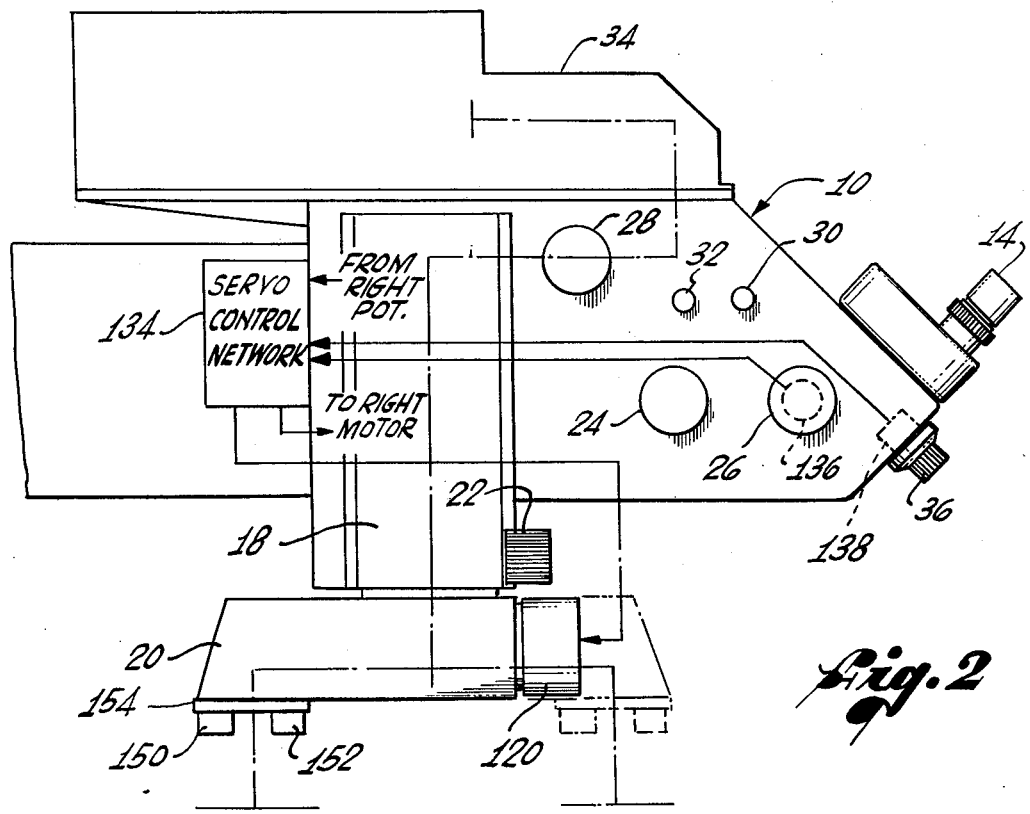
FIG. 2 is a side elevation view of the instrument of FIG. 1, and including schematic representation of the closed loop servo means for operating the zoom control motors via potentiometers operable from control knobs.

Referring to FIGS. 1 and 2, there is shown a housing with a main body portion 10 having an inclined front wall 12 in which eyepieces 14 are supported in mounts so as to be parallel. Extending from the rear portion of each side wall 16 of the housing is a respective vertically movable member 18 which at its lower end supports a rhomboid arm 20. The arm 20 is vertically movable with the member 18, and is also rotatable relative thereto. In this connection, each of the arms 20 is adapted to be rotated by hand to position its outer end above a desired portion of a film in the object plane below it, following which critical angular positioning is effected via a control knob 22 mounted on a shaft extending from the member 18.

Other controls are provided on the side walls 16 which are located in the same relative positions. These include a focus control knob 24, a zoom control knob 26, and an image control knob 28. In addition, controls at one side wall include a control knob 30 for controlling operating positions of optical elements to permit either stereo or mono viewing, and a camera control knob for selectively positioning optical means for directing images to a camera mounted in a camera housing 34 atop the body 10. Still further, a control knob 36 is provided below the eyepieces 14 for operating the zoom lenses simultaneously after they have been properly set by the control knobs 26. Such controls and the positions and functions of elements in the optical system of the invention will now be described with reference to FIGS. 3–6.

Figure 3:
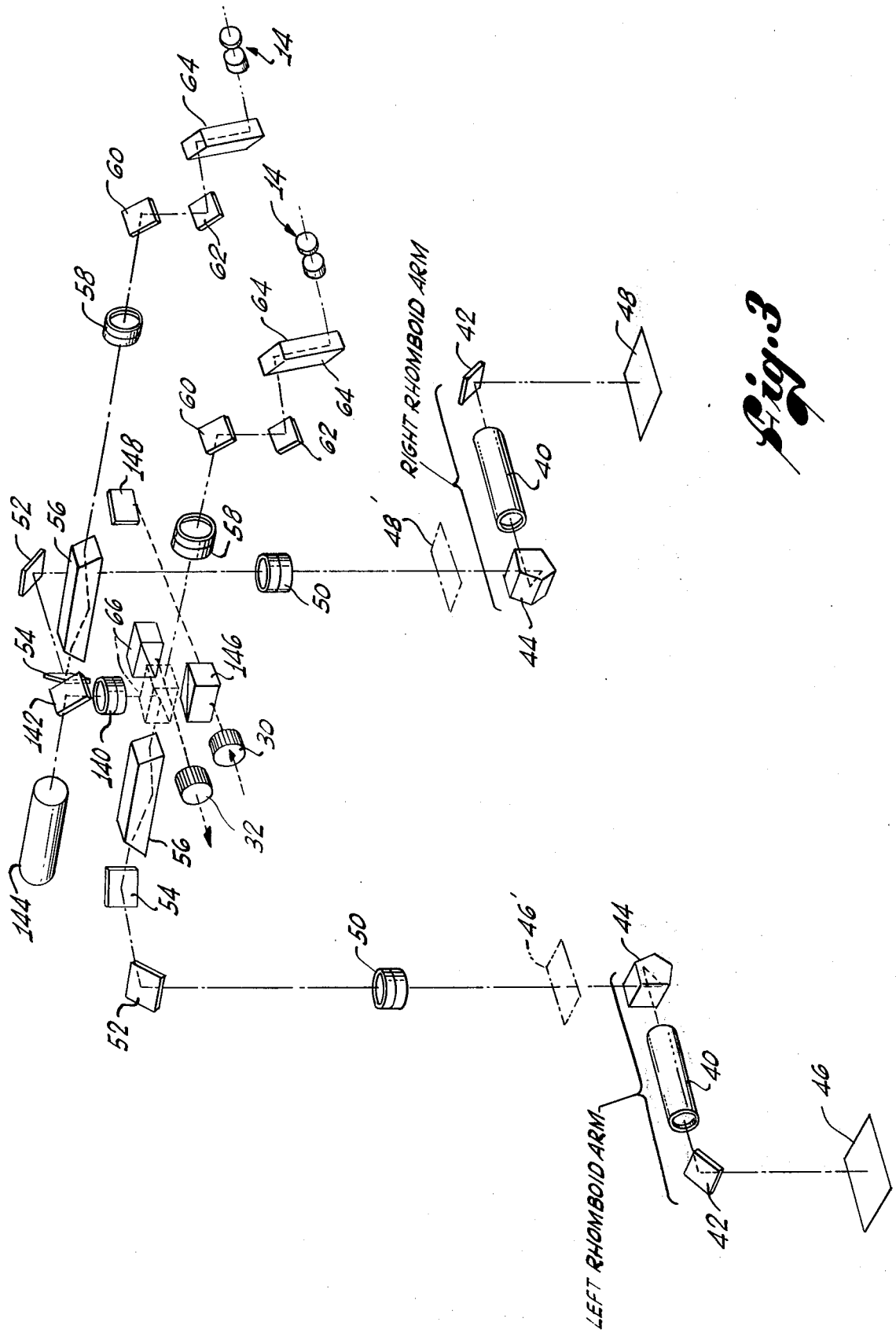
FIG. 3 is a perspective view of the optical elements as arranged in the rhomboid arms and the body of the instruments.

As best seen in FIG. 3, each of the rhomboid arms 20 includes a zoom lens 40 located between right angle reflecting elements, shown as a mirror 42 and a pentaprism 44 at the outer and inner ends of the arm. The image separations 46, 48 in the film or object plane below the mirrors 42 are magnified by the zoom lenses 40. Such zooms are independently adjusted so that the magnified images reflected by the pentaprisms 44 appear at 46', 48' identical in size in an object plane above the pentaprisms 44.

The images 46', 48' are projected vertically as shown, i.e., they are in parallel optical paths, and they are transferred by relay lenses 50 upwardly. The upwardly relayed light beams are reflected by mirrors 52, 54 so as to be directed forwardly along parallel paths. Light reflected from the mirrors 54 passes through image rotators, shown as dove prisms 56. Such image rotators are preferred over Pechan type prisms because they are as well suited for use in the parallel optical paths; they subject light to only one internal reflection; and they are substantially less expensive.

The parallel light beams emerging from the image rotators 56 are projected to the eyepieces 14 via relay lenses 58 and suitable reflecting elements such as mirrors 60, 62 and rhomboid prisms 64. In this latter connection, FIG. 3 shows a beam splitter 66 in dotted position in the path from one image rotator 56, and in solid lines displaced from such path. Operation of such selectively positionable optical elements will be explained hereinafter.

In the system thus far described, i.e., with no optical element such as the beam splitter 66 in the path of the image rotator as indicated, it has been found that the system of this invention is characterized by markedly high light transmission efficiency. With the optical system of this invention, 60% of the light from the object plane entering the rhomboid arms passes through the eyepieces 14, as opposed to about 25 percent for prior art optical systems of photointerpretation stereoscopes as previously mentioned. Further, such advantages are obtained without highly complex and costly lens systems and elements as in such prior instruments, but rather with available and relatively low cost parts. Also, the system of this invention employs relay lenses which have fewer elements of less demanding requirements than those of such prior instruments.

Such advantages and other to be described are derived from placement of elements in the system of this invention so as to position the objectives at the ends of the rhomboid arms and to direct light along parallel paths. Thus, the objective lenses in this invention are the outermost lens elements of the zoom lenses in the system as above described. The zoom lenses magnify and focus the images in the image plane, whereby the relay lenses 50, 58 function to transfer already magnified images of high light levels and sharp contrasts. Further, the positions of the relay lenses 50, 58 permits use of larger diameter lens elements inherently capable of greater light transmissibility then with elements in relay lens optics for the prior instruments.

Reference will be made to FIG. 5 to explain structure suitable for critical positioning of the rhomboid arms via the control knobs 22, 24. For each arm, the relay lens 50 is housed in a vertical tube 70 that is secured at its lower end in the rhomboid arm, and which is rotatable in upper and lower horizontal plates 72, 74. The rhomboid arm is mounted at 75 to the lower plate 74 for rotation relative thereto. Plates 72, 74 are secured to a vertically movable plate 76 which is adapted for such movement by means of roller bearing ways 78, 80 at its vertical edges, such parts 78 of which are secured to the plate 76 and the parts 80 of which are fixed with respect to the body 10 of the housing.

Pivotally mounted at 84 to the housing is a bar 86, the outer end of which rides on a disc 88 which is operable as an eccentric, e.g., with the shaft 90 on which the control knob 24 is mounted being secured to the disc 88 at a point displaced from its center. At its inner end, the bar 86 has a slot 92 slidably receiving a pin 94 that extends from the plate 76. The slot and pin combination 92, 94 permit limited rotational movement of the bar 86, via the eccentric operated by the control knob 24, to effect limited vertical movement of the plate 76 and hence of the rhomboid arm 20 and associated relay lens 50. Accordingly, each rhomboid arm is independently vertically adjustable to compensate for unevenness or differing thicknesses of films being viewed.

Critical angular adjustment via the control knob 22 is effected by suitable gear means. In the arrangement illustrated in FIG. 5, a gear 100 surrounds the tube 70 and is meshed by a gear 102 that is journaled for rotation in the bottom plate 74. Fixed to the gear 102 and to the shaft on which the control knob 22 is fixed are meshed gears 104, 106 through which to convert rotation of the horizontal control knob shaft 108 into rotation of the vertical tube 70 and the rhomboid arm 20 secured thereto. Suitable lock rings (not shown) are employed to secure the knobs and associated parts in place at any selected position for the rhomboid arms.

Figure 4:
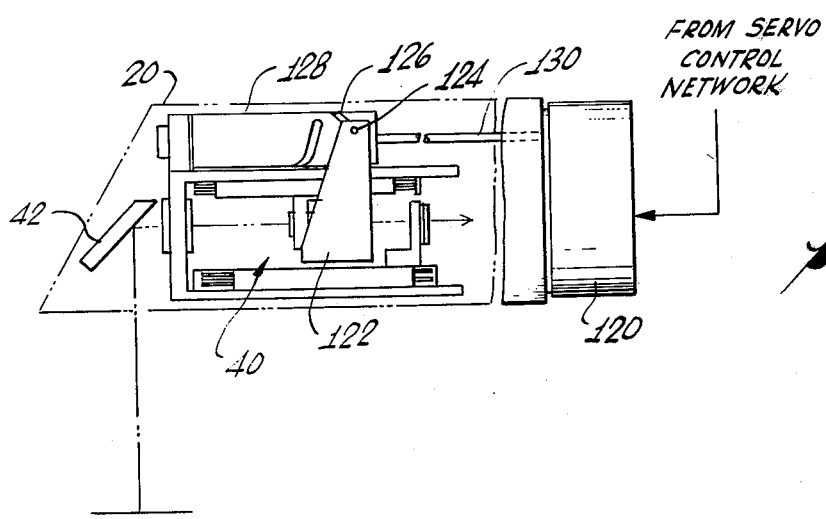
FIG. 4 is a side elevation view of one of the rhomboid arms partially broken away to show the zoom lens and control cam therefor together with the shaft for operating the cam from the motor attached to the inner end of the rhomboid arm.

Preferred zoom lens controls will be explained with reference to FIGS. 1, 2 and 4, which show pancake type servo motors 120 mounted on the inner ends of the rhomboid arms 20. The zoom lenses and cam drive means therefor are illustrated in FIG. 4, and are conventional. A strap 122 carrying movable lens elements has a pin 124 that extends into a groove 126 of an elongated cam element 128. Rotation of the cam 128 effects linear travel of the strap 122 and lens elements carried therewith whereby to establish desired magnification by the zoom lens optics.

Cam rotation is effected by rotating a shaft 130 fixed to the inner end of the cam 128, and which is driven by the motor 120. As illustrated in FIG. 2, the motors 120 are operated via respective outputs of a servo control network 134 shown mounted at the rear of the main body of the instrument. The control network 134 has respective inputs via potentiometers 136 that are operable from the control knobs 26. In typical fashion for closed loop servo systems, movement of the sliding contact of a potentiometer results in an out-of-null condition between input and output, whereupon the network 134 responds to operate the motor until there is a null condition. In the optical system of this invention, the motors are independently controllable by the control knobs 26 to position the zoom lenses 40 so that the images in the image planes 46', 48' are identical in size. Both motors 120 can thereafter be simultaneously controlled from a common potentiometer 138 operable from the control knob 36. For this latter purpose, the control network 134 incorporates suitable switching means for disconnecting the inputs from the potentiometers 136 when it is desired to operate both motors simultaneously from the potentiometer 138.

As previously indicated, beam splitters can readily be inserted into the system of this invention. In this regard, it is well that in steroscopic microscopes with non-parallel light beams, the insertion of a beam splitter in a light beam necessitates focus adjustments. Compensation for such refocusing is required, as by inserting in the light path a glass element having the same optical path length as the beam splitter when the latter is removed from the light path. In the system of this invention, however, there are no such refocusing problems by virtue of the parallel optical paths.

As illustrated in FIG. 3, the beam splitter 66 is adapted via the control knob 32 to be selectively positioned in the path of the light beam emerging from one of the image rotators 56 (the image rotator associated with the left rhomboid arm 20 in FIG. 3). When thus positioned, a portion of the light from the image rotator is directed upwardly and relayed via a relay lens 140 and mirror 142 to a camera 144, e.g., a vidicon camera. The camera is adapted in conventional fashion to cause the image in the left image plane 46' to be projected onto a monitor screen (not shown). The analyst can thus observe a relatively large projected image for cursory inspection of various portions of the image to determine what needs to be examined in detail. For such closer examination, he operates the knob 32 to push the beam splitter 66 out of the light path and view through the eyepieces 14.

Figure 6:
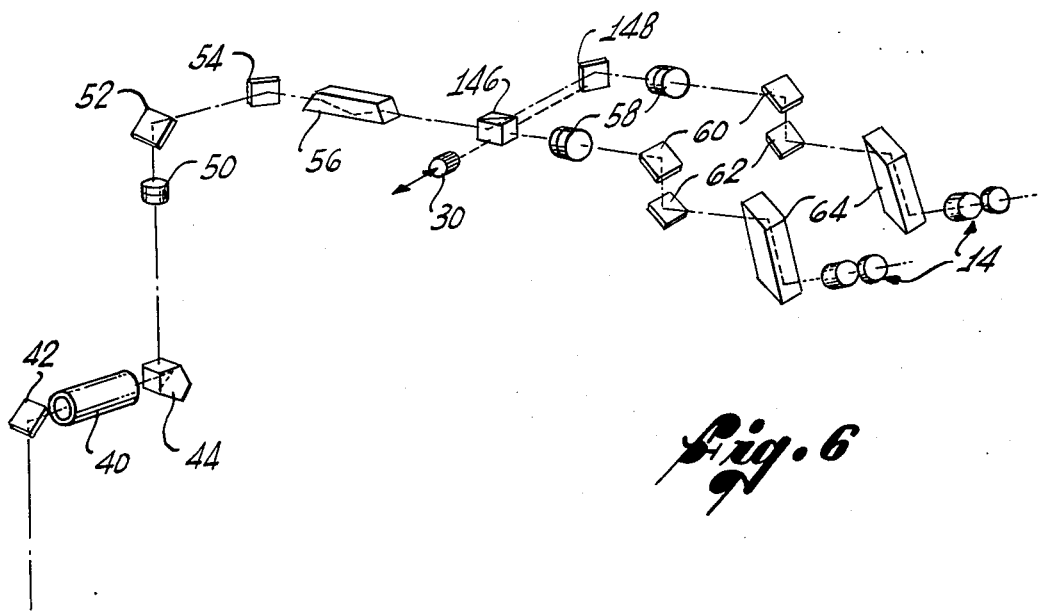
FIG. 6 is a perspective view similar to FIG. 3 showing the beam splitter and mirror in place for converting the instrument from stereo to mono viewing.

Referring to FIGS. 3 and 6, the system of the invention is also adapted for switching between stereo and mono viewing modes. In this connection, the control knob 30 is adapted to selectively move a beam splitter 146 and mirror 148 in unison so that in the knob's mono position (see FIG. 1) the beam splitter 146 is in the path of the beam from one image rotator 56 and the mirror 148 is positioned to block the path from the other image rotator and reflect light from the beam splitter 146 through the relay lens 58 of the blocked path. FIG. 6 shows only the elements that are operative for mono viewing through both the eyepieces 14. In the illustrated arrangement, the knob 30 is pulled out to remove the beam splitter 146 and mirror 148 from the positions shown in FIG. 6 so as to permit stereo viewing.

As with previously described prior art instruments, that of this invention is adapted for use with auxiliary lenses. Such auxiliary lenses are indicated at 150, 152 in FIG. 2 mounted in a slide carrier for selectively positioning either in the light path from the object plane. However, the system of this invention has been found to approximately double the working distance of that of such prior instruments, as compared at the same magnification, numerical aperture and centerline to centerline distance.

Inspection of FIG. 1 discloses the further advantage that the instrument in accordance with this invention is adapted to permit easier viewing of portions of images in the positions of the rhomboid arms where their ends are farthest from the analyst, as well as when the ends of the arms are over portions of film closest to him. For a better understanding of this arrangement, it has been noted that in a typical prior art instrument such as disclosed in a brochure entitled "Zoom 240 Stereoscope" (Bausch & Lomb, 1973), the ends of the rhomboid arms in their forwardmost positions are in a vertical plane nearer the analyst then the eyepieces. This would compare in FIG. 1 to having the eyepieces positioned atop the housing in line with the control dnob 28. Accordingly, where such instruments are positioned and moved over a light table on which films to be analyzed are placed, and the arms are rotated to the rear of the instrument, it requires very little change in instrument position away from the front of the table to force the analyst to an awkward and fatiguing position as he studies details. Because the instrument of theis invention permits eyepieces to be placed a relatively great distance horizontally form the rhomboid arms, and at a more convenient vertical distance from the arms, viewing in comfort is assured. Work time is also vastly increased because the need for frequent rest periods caused by fatigue is eliminated.

I claim:

1. In a photointerpretation stereoscope, the combination of:
   a housing;
   a pair of rhomboid arms mounted at the bottom of said housing;
   a pair of zoom lenses each mounted in a respective rhomboid arm for magnifying one of a pair of image separations positioned in an object plane below the arm;
   means in each arm for causing the magnified image from the zoom lens therein to be directed to an image plane above the arm,
   the light directed upwardly from said arms being along parallel lines;
   parallel image rotators;
   respective means above each image plane for transferring each magnified image from the image plane to one of said image rotators;
   support means for each transfer means;
   means operable from the exterior of said housing for vertically positioning each rhomboid arm and associated support means;
   means operable from the exterior of said housing for independently rotatable positioning each rhomboid arm above the object plane;
   a pair of eyepieces mounted on parallel axes in said housing;
   and further respective transfer means for transferring the images from said image rotator to said eyepieces.

2. The combination of claim 1, wherein the image rotators are dove prisms;
   respective control means operable from the exterior of the housing for selectively positioning said image rotators,
   said image rotators being positioned so that light enters and leaves them in a horizontal plane,
   said eyepieces having their axes in a plane at an angle to the horizontal;
   relay lenses in said further respective transfer means with their axes in said horizontal plane;
   and reflecting elements in said further respective transfer means for directing light emerging from the relay lenses therein through the eyepieces along the plane of their axes.

3. In combination:
   a housing;
   a pair of rhomboid arms mounted at the bottom of said housing;
   a pair of zoom lenses each mounted in a respective rhomboid arm for magnifying one of a pair of image separations positioned in an object plane below the arm;
   means in each arm for causing the magnified image to be directed to an image plane above the arm,
   the light directed upwardly from said arms being along parallel lines;

parallel image rotators;

respective means above each rhomboid arm for transferring each magnified image from the image plane to one of said image rotators;

respective support means for said transfer means;

means operable from the exterior of said housing for vertically positioning each rhomboid arm and associated transfer support means in unison;

means operable from the exterior of said housing for rotatably positioning each rhomboid arm over the object plane;

a pair of eyepieces mounted on parallel axes in said housing;

further respective transfer means for transferring the images from said image rotators to said eyepieces;

respective control means operable from the exterior of said housing for selectively positioning said image rotators, said image rotators being positioned so that light enters and leaves them in a horizontal plane, said eyepieces having their axes in a plane at an angle to the horizontal;

relay lenses in said further respective transfer means with their axes in said horizontal plane;

reflecting elements in said further respective transfer means for directing light emerging from the relay lenses therein through the eyepieces along the plane of their axes;

a beam splitter and reflecting element horizontally movable in unison;

and control means operable from the exterior of the housing for positioning said beam splitter and reflecting element in said horizontal plane so the beam splitter is between the image rotator and the relay lens therein, and said reflecting element is between the other image rotator and relay lens therein, said beam splitter being operable to direct part of the light from the one image rotator to said reflecting element and thence through the other relay lens, said reflecting element blocking light from the other image rotator.

4. In combination:

a housing;

a pair of rhomboid arms mounted at the bottom of said housing;

a pair of zoom lenses each mounted in a respective rhomboid arm for magnifying one of a pair of image separations positioned in an object plane below the arm;

means in each arm for causing the magnified image to be directed to an image plane above the arm, the light directed upwardly from said arms being along parallel lines;

parallel image rotators;

respective means above each rhomboid arm for transferring each magnified image from the image plane to one of said image rotators;

respective support means for said transfer means;

means operable from the exterior of said housing for rotatable positioning each rhomboid arms and associated transfer support means in unison;

means operable from the exterior of said housing for rotatable positioning each rhomboid arm over the object plane;

a pair of eyepieces mounted on parallel axes in said housing;

furhter respective transfer means for transferring the images from said image rotators to said eyepieces;

respective control means operable from the exterior of said housing for selectively positioning said image rotators, said image rotators being positioned so that light enters and leaves them in a horizontal plane, said eyepieces having their axes in a plane at an angle to the horizontal;

relay lenses in said further respective transfer means with their axes in said horizontal plane;

means in said further respective transfer means for directing light emerging from the relay lenses therein through the eyepieces along the plane of their axes;

a beam splitter that is horizontally movable in said horizontal plane;

control means operable from the exterior of said housing for positioning said beam splitter between one image rotator and the relay lens in the path therefrom, said beam splitter directing part of the light from said one image rotator vertically;

a relay lens and reflecting element in the path of the vertically directed light from said beam splitter;

and a camera, said reflecting element functioning to direct the vertically directed light emerging from said relay lens to said camera.

5. The combination of claim 1, including respective motors mounted on the inner ends of said rhomboid arm;

a servo control network having output connections to the respective motors;

first, second and third input connections to said network including respective potentiometers;

respective control means operable from the exterior of said housing for operating said potentiometers;

zoom lens positioning means in each rhomboid arm operable by the motor thereon, the control network responding to operations of the potentiometers in said first and second input connections via the individual control means therefor to operate said motors and positioning means, and responding to operations of the remaining potentiometer via its control means to operate both motors and positioning means simultaneously.

* * * * *